United States Patent
Osuka et al.

(10) Patent No.: US 7,798,019 B2
(45) Date of Patent: Sep. 21, 2010

(54) TORQUE DETECTING APPARATUS, AND METHOD FOR ASSEMBLING TORQUE DETECTING APPARATUS

(75) Inventors: Akio Osuka, Kashihara (JP); Toshiharu Ishihara, Kashiwara (JP); Naoki Nakane, Toyota (JP)

(73) Assignees: JTEKT Corporation, Osaka-Shi, Osaka (JP); Denso Corporation, Kariya-Shi, Aichi (JP)

( * ) Notice: Subject to any disclaimer, the term of this patent is extended or adjusted under 35 U.S.C. 154(b) by 139 days.

(21) Appl. No.: 11/727,798

(22) Filed: Mar. 28, 2007

(65) Prior Publication Data

US 2007/0240521 A1    Oct. 18, 2007

(30) Foreign Application Priority Data

Mar. 29, 2006  (JP) ............................. 2006-091783

(51) Int. Cl.
  *G01L 3/00* (2006.01)
(52) U.S. Cl. .............................. 73/862.331; 73/862.333
(58) Field of Classification Search ............ 73/862.331, 73/862.332, 862.333; 29/602.1
  See application file for complete search history.

(56) References Cited

U.S. PATENT DOCUMENTS

| 4,800,764 | A | * | 1/1989 | Brown ................... 73/862.322 |
|---|---|---|---|---|
| 4,881,414 | A | | 11/1989 | Setaka et al. |
| 2002/0189371 | A1 | | 12/2002 | Nakane et al. |
| 2005/0247138 | A1 | * | 11/2005 | Nakane et al. ......... 73/862.331 |
| 2005/0257991 | A1 | | 11/2005 | Ishii et al. |
| 2005/0257992 | A1 | | 11/2005 | Shiino et al. |

FOREIGN PATENT DOCUMENTS

JP    2003-149062 A    5/2003

\* cited by examiner

*Primary Examiner*—Lisa M Caputo
*Assistant Examiner*—Punam Patel
(74) *Attorney, Agent, or Firm*—Birch, Stewart, Kolasch & Birch, LLP

(57) ABSTRACT

A torque detecting apparatus for detecting rotational torque applied to a first and a second shafts which are coaxially connected to each other by a torsion bar by using a relative angular displacement between a cylindrical magnet fixedly fitted onto the first shaft and integrally rotating with the first shaft and yoke rings surrounding an outer circumference of the first rotating member and integrally rotating with the second shaft. A facing portion is provided between the first and second shafts, and faces each other in the axial direction by a space smaller than a space between a lower end face of the first rotating member and the upper end face of the second shaft. Positioning in the axial direction of the cylindrical magnet and the yoke rings is carried out referring position where the space of the facing surface becomes zero.

4 Claims, 4 Drawing Sheets

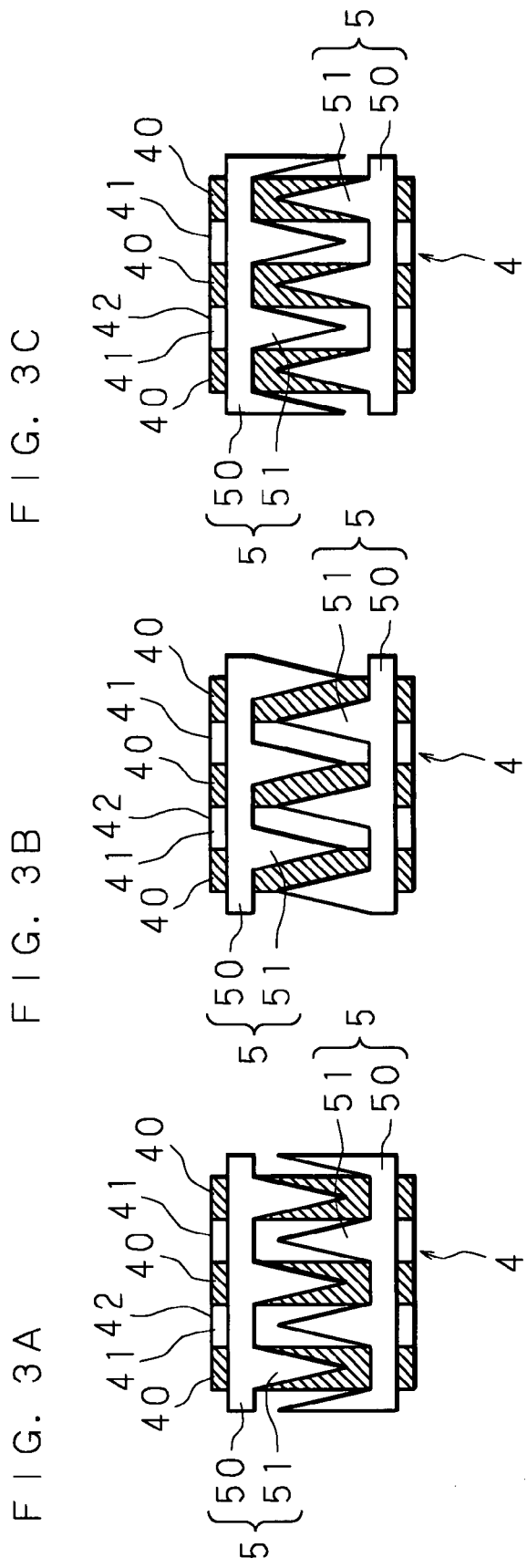

TORQUE DETECTING APPARATUS, AND METHOD FOR ASSEMBLING TORQUE DETECTING APPARATUS

CROSS-REFERENCE TO RELATED APPLICATIONS

This nonprovisional application claims priority under 35 U.S.C. §119(a) on Patent Application No. 2006-091783 filed in Japan on Mar. 29, 2006, the entire contents of which are hereby incorporated by reference.

BACKGROUND OF THE INVENTION

1. Field of the Invention

The present invention relates to a torque detecting apparatus for detecting rotational torque applied to a rotating shaft, and also relates to a method for assembling the same.

2. Description of the Related Art

An electric power steering apparatus have widely been used for assisting a steering operation by applying driving power of an electric motor to a steering mechanism upon responding to a turning operation of a steering member such as a steering wheel. In general, such a conventional electric power steering apparatus is provided with a torque detecting apparatus for detecting a steering torque applied to a steering member thus to control driving of the electric motor for assisting the steering. Such torque detecting apparatus is configured so that a steering shaft (rotating shaft), for connecting the steering member and the steering mechanism, is divided into two, first and second, shafts, which are coaxially connected to each other by a small diameter torsion bar, and the steering torque (rotational torque) applied to the steering shaft by the operation of the steering member can be detected as a relative angular displacement between the first shaft and the second shaft derived from a twist of the torsion bar.

As torque detecting means for detecting the relative angular displacement between the first shaft and the second shaft has been conventionally proposed in various configurations. One example of such prior art is known which is provided with a cylindrical magnet (first rotating member) fixedly fitted to an outer surface of the first shaft and a yoke ring (second rotating member) surrounding an outer circumference of the cylindrical magnet and integrally rotates with the second shaft, and configured so as to detect the relative angular displacement between the first shaft and the second shaft from a change in the magnetic circuit between the cylindrical magnet and the yoke ring (for example, referring to Japanese Patent Application Laid-open No. 2003-149062).

In the conventional torque detecting apparatus, the cylindrical magnet is configured by arranging N poles and S poles alternately in the circumferential direction thereof, and fixedly fitted to the outer surface of the first shaft. The yoke ring is configured by a pair of thin rings made of soft magnetic, sized substantially identical to each other, and provided with magnetic pole teeth which are identical in the number to the N and S poles and arranged circumferentially at equal intervals on an end edge of one side of a circular ring body of the yoke ring. The two rings are formed integral by a mold body made of a resin formed in a cylindrical shape. In the integrally formed state, the two rings are positioned so that the magnetic pole teeth of both rings are alternately arranged in the circumferential direction and each magnetic pole tooth arranged on one ring is positioned at the center between each adjoining magnetic pole teeth arranged on the other ring. The mold body is fixedly fitted onto the connecting side end portion of the second shaft by a metallic collar formed integrally with one side end portion thereof.

In a neutral state where any relative angular displacement between the first shaft and the second shaft is not present, the cylindrical magnet and the yoke ring are positioned in the circumferential direction and assembled together so that each of the magnetic pole teeth corresponds to the boundary between the N pole and the S pole of the cylindrical magnet. Accordingly, when a relative angular displacement between the first shaft and the second shaft is caused by the steering shaft being applied the steering torque, the positional relationship between the magnetic pole teeth of the two yoke rings and the magnetic poles of the cylindrical magnet is changed. As the positional relationship is changed, the magnetic flux generated in the two yoke rings changes. A change in the magnetic flux is then detected to determine the magnitude of the steering torque.

It is however necessary for assembling the conventional torque detecting apparatus to correctly position the cylindrical magnet integrally rotating with the first shaft and the yoke rings integrally rotating with the second shaft so that their positional alignment is ensured in not only the circumferential direction but also the axial direction.

The positioning in the axial direction is carried out by relatively moving the first shaft and the second shaft in the axial direction before the first shaft and the second shaft are connected to each other by the torsion bar. Nevertheless, since the cylindrical magnet and the yoke rings to be positioned are located in the housing which rotatably supports the first shaft and the second shaft, their positional relationship may hardly be acknowledged by view. Thus, conventionally, positioning in the axial direction was taken as below. At first, while the second shaft is positioned and supported in the housing, the first shaft is lowered and inserted until the end portion of the cylindrical magnet fixedly fitted onto the first shaft collides against the second shaft or the yoke rings formed integrally with the second shaft. Then, using the collision position as a reference position, the first shaft is moved back or lifted up in a direction of departing from the second shaft by a predetermined distance.

However, the cylindrical magnet fixedly fitted onto the first shaft includes a group of magnetic segments of a rectangular shape which are arranged in the circumferential direction and assembled together with the mold body of a resin in a cylindrical shape. As the cylindrical magnet is fixedly fitted onto the first shaft by the mold body, the mold body of a resin may be injured thus to have, for example, cracks or flaws by the first shaft colliding against the second shaft for determining the reference position during the positioning operation described above.

When the cylindrical magnet integrally formed with the mold body having any fault which is not acknowledged is positioned in both the axial direction and the circumferential direction and assembled to the apparatus, its fixing strength remains low thus permitting the accuracy of the torque detection to be declined. Such a drawback may be lessened by minimizing the collision between the two shafts for determining the reference position. It is not yet assured that the mold body is protected from any fault, while the assembling process becomes more intricate.

As explained, any other conventional torque detecting apparatus in an electric power steering apparatus is similarly arranged for detecting a relative angular displacement between the first shaft and the second shaft connected to each other by the torsion bar with the use of various detecting means. Thus, since any other conventional torque detecting apparatus is adapted for detecting a relative angular displacement between a first rotating member fixedly fitted onto the first shaft and a second rotating member integrally rotating with the second shaft, its relative positioning in the axial direction of the two rotating members will encounter the foregoing drawback.

BRIEF SUMMARY OF THE INVENTION

The present invention has been developed in view of the above circumstances and its object is to provide a torque detecting apparatus in which the positioning in the axial direction of the first and second rotating members integrally rotating with the first shaft and the second shaft, respectively can be conducted surely and easily, and a method for assembling the torque detecting apparatus.

A torque detecting apparatus according to the present invention is a torque detecting apparatus for detecting rotational torque applied to a first shaft and a second shaft which are coaxially connected to each other by a torsion bar, by using a relative angular displacement generated, accompanying with a twist of the torsion bar, between a first rotating member fixedly fitted onto the first shaft and integrally rotating with the first shaft and a second rotating member surrounding an outer circumference of the first rotating member and integrally rotating with the second shaft. The torque detecting apparatus is characterized by comprising a facing portion which is provided between the first shaft and the second shaft, and makes the first shaft and the second shaft face each other in the axial direction by a space smaller than a space between a lower end face of the first rotating member and the upper end face of the second shaft.

A method according to the present invention is a method for assembling torque detecting apparatus, which detects rotational torque applied to a first shaft and a second shaft which are coaxially connected to each other by a torsion bar, by using a relative angular displacement generated between a first rotating member fixedly fitted onto the first shaft and integrally rotating with the first shaft and a second rotating member surrounding an outer circumference of the first rotating member and integrally rotating with the second shaft, with positioning the first rotating member and the second rotating member in both the circumferential direction and the axial direction. The method is characterized by comprising: providing between the first shaft and the second shaft with a facing portion which makes the first shaft and the second shaft face each other in the axial direction by a space smaller than a space between a lower end face of the first rotating member and the upper end face of the second shaft; determining a reference position for positioning the first rotating member and the second rotating member in the axial direction by making the space of the facing member become zero; positioning the first rotating member and the second rotating member in the axial direction by moving the first shaft with respect to the second shaft from the determined reference position by a predetermined space upwardly in the axial direction; and positioning the first rotating member and the second rotating member in the circumferential direction by relatively rotating the first shaft and the second shaft, after positioning the first rotating member and the second rotating member in the axial direction has been completed.

According to the present invention, the facing portion to face each other in the axial direction by the space smaller than the space between the lower end face of the first rotating member and the upper end face of the second shaft. Since the positioning in the axial direction between the first rotating member and the second rotating member is carried out using a reference where the space of the facing portion becomes zero, the first rotating member can be prevented from collision against either the second shaft or the second rotating member.

The above and further objects and features of the invention will more fully be apparent from the following detailed description with accompanying drawings.

BRIEF DESCRIPTION OF THE SEVERAL VIEWS OF THE DRAWINGS

FIG. 3A, FIG. 3B, and FIG. 3C are explanatory views showing the positional relationship along the circumference between the magnetic pole teeth of yoke rings and the magnetic poles of a cylindrical magnet.

DETAILED DESCRIPTION OF THE INVENTION

Figure 1:
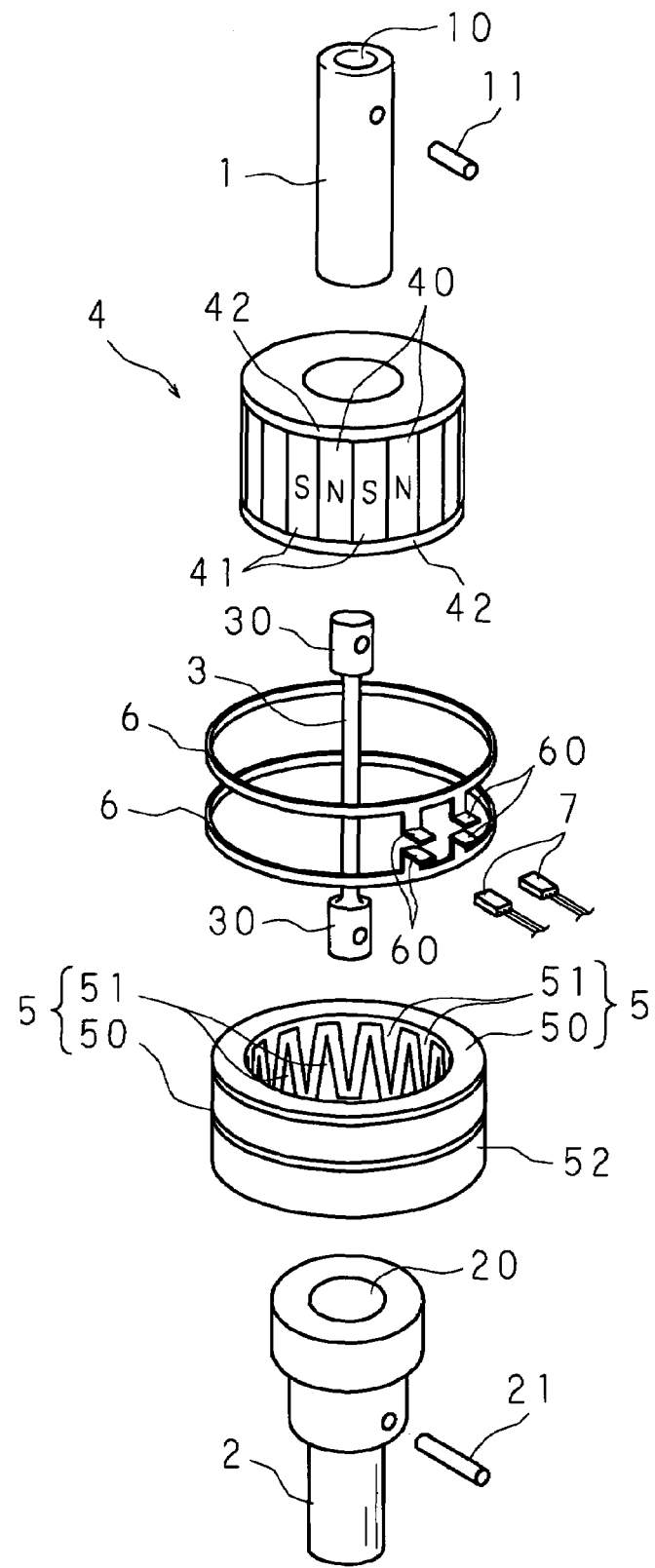
FIG. 1 is an exploded perspective view of a torque detecting apparatus according to the present invention.
Figure 2:
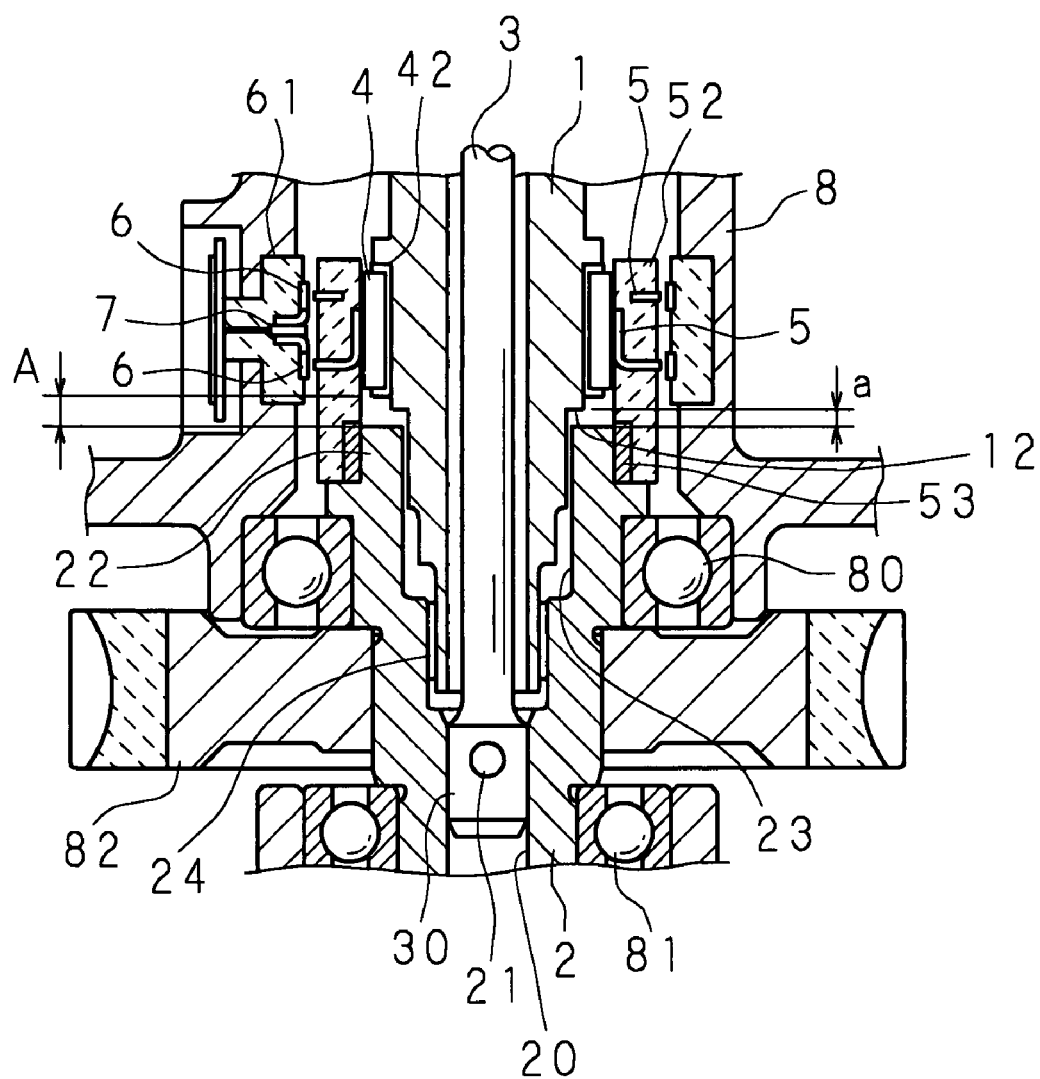
FIG. 2 is a longitudinally cross sectional view showing an essential portion in an assembled state of the torque detecting apparatus according to the present invention.

Preferred embodiments of the present invention will be described in detail, referring to the relevant drawings. FIG. 1 is an exploded perspective view of a torque detecting apparatus according to the present invention, and FIG. 2 is a longitudinally cross sectional view showing an essential portion in the assembled state of the same.

The torque detecting apparatus according to the present invention intends to detect the torque applied to two shafts (a first shaft and a second shaft) which are connected coaxially to each other by a torsion bar 3. The torque detecting apparatus according to the present invention is configured by comprising a cylindrical magnet 4 integrally rotating with the first shaft 1, a pair of yoke rings 5, 5 integrally rotating with the second shaft 2, magnetism collecting rings 6, 6 for collecting magnetic fluxes generated in the yoke rings 5, 5, respectively, and two magnetic sensors 7, 7 disposed between the magnetism collecting rings 6 and 6 as will be described later in more detail.

The torsion bar 3 is a small-diameter round bar as a torsion spring. At both end portions of the torsion bar 3, connecting portions 30, 30 having large-diameters for respectively connecting the first shaft 1 and the second shaft 2 are formed, respectively. The first shaft 1 and the second shaft 2 are integrally connected by fitting the connecting portions 30, 30 at the both end portions of the torsion bar 3 into a connecting bores 10, 20 formed respectively in the axial center portions of the first shaft 1 and the second shaft 2, and by knocking respective connecting pins 11 and 21 after positioning in both the axial direction and the circumferential direction.

When rotational torque is applied to the first shaft 1 and the second shaft 2 connected in such manner, torsional distortion is generated in the torsion bar 3 by action of the rotational torque. As a result, between the first shaft 1 and the second shaft 2, a relative angular displacement corresponding to the magnitude of the applied torque is generated in the direction of the applied torque.

In FIG. 2, in an electric power steering apparatus, an example is shown where the torque detecting apparatus according to the present invention is applied as a steering torque detecting means for detecting the steering torque applied to the steering shaft for connecting a steering member and a steering mechanism. The first shaft 1 and the second shaft 2 which are respective shaft by dividing the steering shaft at middle are coaxially connected to each other by the torsion bar 3. The first shaft 1 at the upper position is connected to the steering member not shown, while the second shaft 2 at the lower position is connected to the steering mechanism not shown. It is noted that the connecting portion of the torsion bar 3 and the second shaft 2 only is shown in FIG. 2.

The second shaft 2 at the side of the steering mechanism is supported at two positions by upper and lower two bearings 80 and 81 in a housing 8 which is partially shown in FIG. 2. A worm wheel 82 is fixedly fitted between the two bearings 80 and 81. The worm wheel 82 is meshed with a worm (not shown) fixed to the output shaft of an electric motor for assisting steering. When the electric motor for assisting steering is driven, rotation generated by the electric motor for assisting steering is reduced and transmitted to the worm wheel 82, and a steering assistance force is applied as to the steering mechanism via the second shaft 2.

The second shaft 2 has a large-diameter connecting cylinder (facing member) 22 connectedly provided above the supporting position of the bearing 80. The end portion at the connecting side of the first shaft 1 is inserted by a proper length into a support bore 23 which opens at the end face of the connecting cylinder 22 and, continues to the connecting bore 20 of the torsion bar 3. The first shaft 1 is supported maintaining coaxially state with the second shaft 2 by a bush 24 tightly fitted into the support bore 23.

As shown in FIG. 1, the cylindrical magnet 4 integrally rotating with the first shaft 1, in which a plurality of N poles 40, 40, . . . and a plurality of S poles 41, 41, . . . are arranged alternately in the circumferential direction, is covered its end faces and inner face with a mold body 42 made of resin by suitable thickness, and is configured as a multi-pole magnet. The cylindrical magnet 4 is fixedly fitted onto the first shaft 1 interposing the mold body 42, and positioned in the axial direction so that the lower end face of the mold body 42 and the upper end face of the connecting cylinder 22 of the second shaft 2 face each other at a predetermined space A, as shown in FIG. 2.

As shown in FIG. 2, a portion of the first shaft 1 onto which the cylindrical magnet 4 is fixedly fitted is formed greater in a diameter than the other portion and is extended across and downwardly from the cylindrical magnet 4. As a lower end portion of the extended large diameter portion is perpendicularly cut down, that is, toward the shaft center, a facing surface 12 which faces an upper end face of the connecting cylinder 22 of the second shaft 2 by a space a is formed. A facing portion is composed of these connecting cylinder 22 as the facing member and the facing surface 12. The space of the facing portion, specifically, the space a between the upper end face of the connecting cylinder 22 and the facing surface 12 is set smaller than the space A between the upper end face of the connecting cylinder 22 and the lower end face of the mold body 42, as shown in FIG. 2.

As shown in FIG. 1, the yoke rings 5, 5 integrally rotating with the second shaft 2 are circular rings made of soft magnetic each having a ring-like shape yoke body 50 onto whose inner circumference edge magnetic pole teeth 51, 51, . . . are arranged at equal intervals along thereof, each tooth extending in the axial direction. Each magnetic pole tooth 51 of the yoke ring 5 is formed in a triangular shape which is extended from the base of the yoke body 50 and made to be narrower in the width towards the distal end. The magnetic pole teeth 51 are provided as equal to the number of sets of the N poles 40 and S poles 41 of the cylindrical magnet 4. The two yoke rings 5, 5 are coaxially arranged in such a manner that their magnetic pole teeth 51 face at the distal end and the each magnetic pole teeth 51 of both yoke rings 5, 5 align alternately in the circumferential direction. Then, the outer sides of the two yoke rings 5, 5 are covered integrally with the mold body 52 of a resin formed in a cylindrical shape by molding.

The yoke rings 5, 5 configured as described above are fixedly fitted onto the connecting cylinder 22 at the upper end portion of the second shaft 2 through a collar 53 which is made to be integral with the inner circumference of the lower end portion of the mold body 52, as shown in FIG. 2. It is noted that respective inner surface of the yoke rings 5, 5 is spaced by a small air gap from the outer circumference of the cylindrical magnet 4 fixedly fitted to the first shaft 1 so that the yoke rings 5, 5 are assembled with respect to the cylindrical magnet 4 under a state where a predetermined positional relationship with respect to the cylindrical magnet 4 in the axial direction and circumferential direction can be obtained.

FIG. 3A, FIG. 3B, and FIG. 3C are explanatory views showing the positional relationship between the magnetic pole teeth of the yoke rings and the magnetic poles of the cylindrical magnet. In FIG. 3B, the relationship between the magnetic pole teeth 51, 51, . . . of both the yoke rings 5, 5 and each N magnetic pole 40 and each S magnetic pole 41 of the cylindrical magnet 4 in the assembled state is shown. As aligned with each other in the axial direction (the vertical in the drawings), the yoke rings 5, 5 and the cylindrical magnet 4 are relatively positioned in the circumferential direction so that the distal end of each of the magnetic pole teeth 51, 51, . . . of one of the two yoke rings 5 corresponds to each boundary between the N pole 40 and the S pole 41 (or the S pole 41 and the N pole 40) arranged on the circumference of the cylindrical magnet 4 while the distal end of each of the magnetic pole teeth 51, 51, . . . of the other yoke ring 5 corresponds to each boundary between the S pole 41 and the N pole 40 (or the N pole 40 and the S pole 41) arranged on the circumference of the cylindrical magnet 4. Therefore, each magnetic pole teeth 51 of the two yoke rings 5, 5 is positioned in the magnetic field generated between the adjacent N pole 40 and the S pole 41 at the circumference of the cylindrical magnet 4 under the same condition. As the result, the magnetic flux which are generated in the two yoke bodies 50, 50 communicating each proximal ends of the magnetic pole teeth 51 become equal.

The positional relationship in the circumferential direction between the magnetic pole teeth 51, 51, . . . and the N poles 40 and S poles 41 changes in such opposite directions as shown in FIG. 3A or FIG. 3C, depending on the relative angular displacement generated, accompanying with a twist of the torsion bar 3, between the first shaft 1 to which the cylindrical magnet 4 is fixed and the second shaft 2 to which the yoke rings 5, 5 are fixed. When such change occurs, because the lines of magnetic force at the opposite polarities increase in the magnetic pole teeth 51, 51, . . . of one yoke rings 5 and the magnetic pole teeth 51, 51, . . . of other yoke rings 5, 5, the positive or negative magnetic flux are generated in the respective yoke bodies 50, 50.

The positive or negative of the magnetic flux is determined by the direction of the relative angular displacement between the cylindrical magnet 4 and the yoke rings 5, 5, that is, between the first shaft 1 and the second shaft 2. Also, the density of the positive or negative magnetic flux is determined by the magnitude of the relative angular displacement between the first shaft 1 and the second shaft 2. Accordingly, when the positive or negative and density of the magnetic flux generated in the yoke bodies 50, 50 is detected, it can be found the relative angular displacement between the first shaft 1 and the second shaft 2, that is, the direction and magnitude of the rotational torque (the steering torque) applied to the first shaft 1 and the second shaft 2.

The magnetic flux generated in the yoke rings 5, 5 are collected by the magnetism collecting rings 6, 6 and then detected by the magnetic sensors 7, 7. The magnetism collecting rings 6, 6 are circular rings made of soft magnetic, and whose inner diameter is slightly greater than the outer diameter of the yoke body 50. As shown in FIG. 1, each of the magnetism collecting rings 6, 6 has magnetism collecting portions 60, 60 at the two positions corresponding with each other by extending therefrom in the axial direction and then bending their distal ends outwardly at substantially a right angle. These magnetism collecting rings 6, 6 are arranged coaxially with the extending sides of the magnetism collecting portions 60, 60 opposite to each other at the distal end, and are positioned in the axial direction so that their magnetism collecting portions 60, 60 become opposite to each other at the distal end and separated by a predetermined air gap. Furthermore, as shown in FIG. 2, the two magnetism collecting rings 6, 6 are formed in a single unit by being covered integrally with a mold body 61 of a resin formed in a cylindrical shape by molding.

Between the air gaps of the two opposite magnetism collecting portions 60, 60 of the magnetism collecting rings 6, 6, the magnetic sensors 7 composed of a magnetic detecting element such as a Hall device are disposed.

As described above, the mold body 61 holding the magnetism collecting rings 6, 6 and the magnetic sensors 7, 7 is fixedly fitted in the housing 8 under the state where the respective magnetism collecting rings 6, 6 exposing to the inner surface are arranged to face at close proximity to the outer surfaces of the corresponding yoke rings 5, 5, as shown in FIG. 2. As the result, to the magnetism collecting rings 6, 6, the magnetic flux generated in the yoke rings 5, 5 to be dissipated thereto is induced and collected to the magnetism collecting portions 60, 60. Then, because the magnetic flux is leaked up in the air gap between the magnetism collecting portions 60, 60, the magnetic sensors 7, 7 generate outputs corresponding to the density of the leaked magnetic flux.

The density of the magnetic flux detected by the magnetic sensors 7, 7 changes depending on the magnetic flux in the yoke rings 5, 5 opposite to the inner side of the magnetism collecting rings 6, 6. Also as described previously, this magnetic flux changes depending on the relative angular displacement between the first shaft 1 and the second shaft 2. Accordingly, the outputs of the magnetic sensors 7, 7 correspond to the direction and magnitude of the rotational torque applied to the first shaft 1 and the second shaft 2 which generates a relative angular displacement between them and can thus be detected the rotational torque applied to the first shaft 1 and the second shaft 2 based on the output change of these magnetic sensors 7, 7. The reason why the two magnetic sensors 7, 7 are provided is that while one is for detecting the torque, while the other is for judging a fail-safe operation. For example, the fail-safe operation is carried out by a known procedure such that the outputs of the magnetic sensors 7, 7 are compared with each other in time series and when a significant difference between the two outputs is found, the magnetic sensor 7 whose outputs has been unstable at before and after that time is judged to be fail state.

For detecting the rotational torque at higher accuracy, it is necessary for positioning the cylindrical magnet 4 and the yoke rings 5, 5 with correctness in both the axial direction and the circumferential direction. The positioning should be made by relatively moving the first shaft 1 to which the cylindrical magnet 4 is fixed and the second shaft 2 to which the yoke rings 5, 5 are fixed before the first shaft 1 and the second shaft 2 are connected to each other by the torsion bar 3.

Figure 4A:
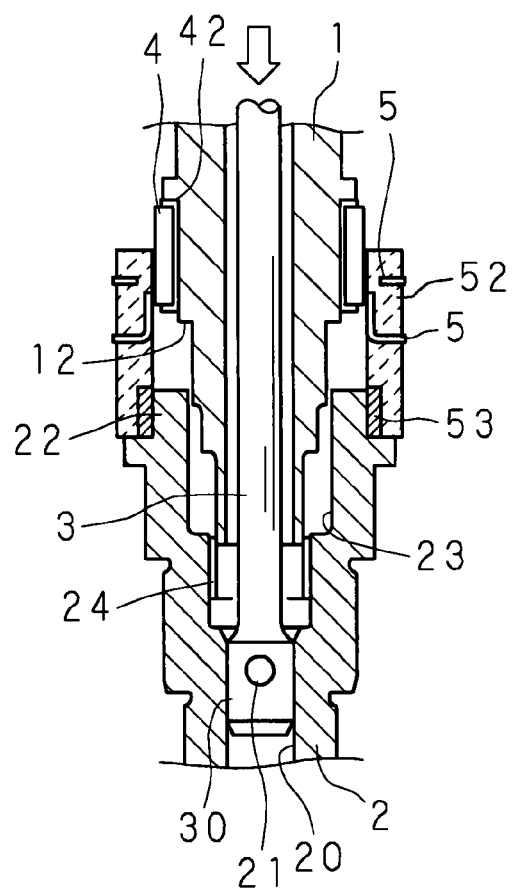
FIG. 4A and FIG. 4B are explanatory views showing a procedure of positioning the cylindrical magnet and the yoke ring.
Figure 4B:
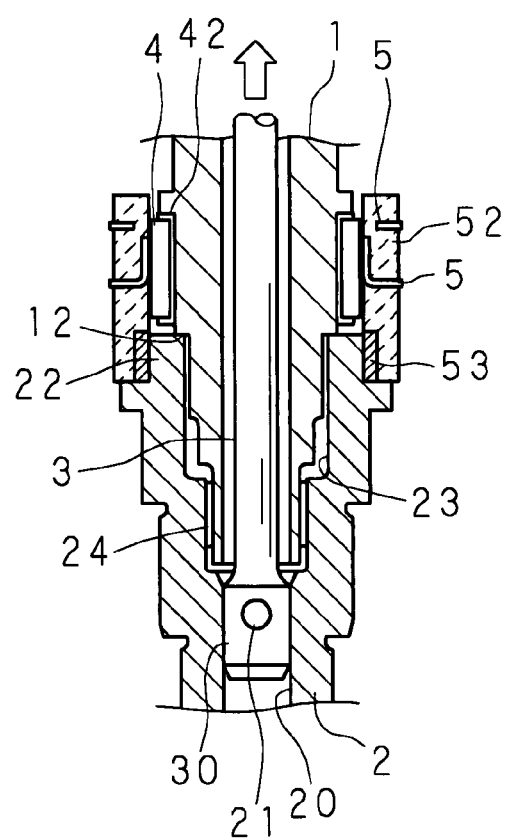

FIG. 4A and FIG. 4B are explanatory views showing a procedure of the positioning of the cylindrical magnet 4 and the yoke rings 5, 5. At the time of the positioning, the second shaft 2 to which the yoke rings 5, 5 are fixed is previously positioned and supported by the two bearings 80 and 81 in the housing 8. Then, with respect to the second shaft 2, under the state where the first shaft 1 to which the cylindrical magnet 4 is fixed is coaxially positioned, the front end of the first shaft 1 is moved in the direction close up to the second shaft 2 and inserted into the support bore 23 opened at the end portion of the connecting cylinder 22, as shown in FIG. 4A.

At this time, the torsion bar 3 has been fitted into the connecting bore 20 and connected to the second shaft 2 by the connecting pin 21 while it is not connected to the first shaft 1. Meanwhile, the first shaft 1 is movable in relation to the second shaft 2 in both the axial direction and the circumferential direction. In FIG. 4A and FIG. 4B, it is noted that the housing 8 and the bearings 80 and 81 are not illustrated.

The movement of the first shaft 1 in the axial direction is carried out until the facing surface 12 of the first shaft 1 comes into contact with the upper end face of the connecting cylinder 22 of the second shaft 2 and its movement is no more permitted. In other words, a state where the space a of the facing member is zero is made to be a reference position in the axial direction. FIG. 4B illustrates the state where the first shaft 1 coming into direct contact with the second shaft 2. As described previously, at the downwardly extending end portion, to which the cylindrical magnet 4 is fitted, of the first shaft 1 of the torque detecting apparatus according to the present invention, the facing surface 12 which faces to the upper end face of the connecting cylinder 22 of the second shaft 2 in the axial direction is formed. The space a between the facing surface 12 and the upper end face of the connecting cylinder 22 is set smaller than the space A between the lower end face of the cylindrical magnet 4 and the upper end face of the connecting cylinder 22. Because such relationship between the two spaces a and A, collision of the first shaft 1 against the second shaft 2 occurs when the facing surface 12 collides against the connecting cylinder 22, as shown in FIG. 4B.

At this time, the cylindrical magnet 4 faces to the upper end face of the connecting cylinder 22 of the second shaft 2 with keeping a predetermined space (=A−a). As a result, there is no fear that the cylindrical magnet 4, concretely, the resin mold body 42 covering the outer side of the cylindrical magnet 4 collides against the second shaft 2, concretely, the upper end face of the connecting cylinder 22. Accordingly, at the colliding of the first shaft 1 against the second shaft 2 carried out in the housing 8 not viewing, even when the first shaft 1 is made to be collided against the second shaft 2, the mold body 42 of the connected cylindrical magnet 4 is prevented from any physical fault such as cracks or flaws.

After realizing the above mentioned colliding state, by making a position of the first shaft 1 with respect to the second shaft 2 as a reference position, the first shaft 1 is moved back with respect to the second shaft 2 by a distance corresponding to the above mentioned space a (See FIG. 2) in the direction departing from the second shaft 2 as denoted by a white arrow in FIG. 4B. As described above, the positioning of the first shaft 1 with respect to the second shaft 2 in the axial direction is completed. As the result, the space a between the upper end face of the connecting cylinder 22 of the second shaft 2 and the facing surface 12 of the first shaft 1 is secured, and the space A between the upper end face of the connecting cylinder 22 and the lower end face of the cylindrical magnet 4 is also secured. This means that the cylindrical magnet 4 is correctly aligned and positioned in the axial direction with respect to the yoke rings 5, 5 as shown in FIG. 2.

After the positioning in the axial direction has been completed, the positioning of the cylindrical magnet 4 and the yoke rings 5, 5 in the circumferential direction is carried out. When the positional relationship between the cylindrical magnet 4 and the yoke rings 5, 5 in the circumferential direction is changed, the outputs of the two magnetic sensors 7, 7 disposed between the magnetism collecting rings 6, 6 change as described above. Accordingly, the positioning in the circumferential direction between them can be carried out by procedure such that the first shaft 1 is rotated with respect to the second shaft 2 in the circumferential direction while monitoring the outputs of the magnetic sensors 7, 7. After the above positioning has been completed, a through hole penetrating the first shaft 1 and the upper side connecting portion 30 of the torsion bar 3 is bored for knocking the connecting pin 11. Then, by knocking the connecting pin 11 into the through hole, the other end portion of the torsion bar 3 is connected to the first shaft 1. As the result, the first shaft 1 and the second shaft 2 are integrally connected.

As the torsion bar 3 is connected to the first shaft 1 as mentioned above, the cylindrical magnet 4 and the yoke rings 5, 5 are positioned in not only the circumferential direction but also the axial direction, so that torque detection is carried out at higher accuracy. In this invention, the collision of the first shaft 1 and the second shaft 2 necessary for positioning the cylindrical magnet 4 and the yoke rings 5, 5 occurs between the facing surface 12 provided at the first shaft 1 and the connecting cylinder 22 provided at the second shaft 2. Therefore, the resin mold body 42 holding the cylindrical magnet 4 is prevented from being injured. Accordingly, because the fixing strength of the cylindrical magnet 4 can be secured enough without intricate schemes of the assembling, it can eliminate any declination in the accuracy of the torque detection derived from its fixing fault and also contribute to the improvement of the productivity or the yield of products and the cost down of the products. As set forth above, the torque detecting apparatus of the present invention will highly be suited for detecting the steering torque applied to the steering member in an electric power steering apparatus as shown in the embodiment.

In the embodiment described above, description is made on the torque detecting apparatus configured such that the cylindrical magnet 4 as the first rotating member fixedly fitted onto the first shaft 1 is provided, and its relative angular displacement with respect to the yoke rings 5, 5 (the second rotating member) integrally rotating with the second shaft 2 is detected. It would however be understood that the present invention is not limited to the torque detecting apparatus of this embodiment but may equally be applied to any other torque detecting apparatus which has a first rotating member and a second rotating member of another configuration and needs to determine the positional relationship in the axial direction between the first and second rotating members.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds there-of are therefore intended to be embraced by the claims.

What is claimed is:

1. A torque detecting apparatus for detecting rotational torque comprising:
   a first shaft and a second shaft which are coaxially connected to each other by a torsion bar;
   a first rotating member fixedly fitted onto said first shaft and integrally rotating with said first shaft;
   a second rotating member surrounding an outer circumference of said first rotating member and integrally rotating with said second shaft; and
   a facing portion which is provided between said first shaft and said second shaft, and makes said first shaft and said second shaft face each other in the axial direction by a space smaller than a space between a lower end face of said first rotating member and an upper end face of said second shaft,
   wherein a longitudinal distance between said lower end face of the said first rotating member and said upper end face of said second shaft is longer than a longitudinal distance between said first shaft and said upper end face of said second shaft,
   said torque detecting apparatus detects rotational torque applied to said first shaft and said second shaft, by using a relative angular displacement generated between said first rotating member and said second rotating member, accompanying with a twist of said torsion bar, and
   said longitudinal distance between said first shaft and said upper end face of said second shaft is more than zero.

2. The torque detecting apparatus as set forth in claim 1, wherein said facing portion includes a facing surface provided on said first shaft and a facing member provided on an upper portion of said second shaft,
   said facing surface is configured by a face perpendicular to the axial direction and formed at lower than a portion of said first shaft onto which said first rotating member is fixedly fitted,
   said facing member has an upper end face which is an upper end face of said second shaft, and
   a space between said facing surface and said upper end face of said facing member is set to a.

3. A method for assembling torque detecting apparatus, which detects rotational torque applied to a first shaft and a second shaft which are coaxially connected to each other by a torsion bar, by using a relative angular displacement generated between a first rotating member fixedly fitted onto said first shaft and integrally rotating with said first shaft and a second rotating member surrounding an outer circumference of said first rotating member and integrally rotating with said second shaft, with positioning said first rotating member and said second rotating member in both the circumferential direction and the axial direction, said method comprising:
   providing between said first shaft and said second shaft with a facing portion which makes said first shaft and said second shaft face each other in the axial direction, wherein a longitudinal distance between said lower end face of said first rotating member and said upper face of said second shaft is longer than a longitudinal distance between said first shaft and said upper end face of said second shaft;
   determining a reference position for positioning said first rotating member and said second rotating member in the axial direction by making said space of said facing member become zero;
   positioning said first rotating member and said second rotating member in the axial direction by moving said first shaft with respect to said second shaft from the determined reference position by a predetermined space upwardly in the axial direction, so that a longitudinal distance between said first shaft and said upper end face of said second shaft is more than zero; and positioning said first rotating member and said second rotating member in the circumferential direction by relatively rotating said first shaft and said second shaft, after positioning said first rotating member and said second rotating member in the axial direction has been completed.

4. The method as set forth in claim 3, wherein said facing portion includes a facing surface provided on said first shaft and a facing member provided on an upper portion of said second shaft, said facing surface is configured by a face perpendicular to the axial direction and formed at lower than a portion of said first shaft onto which said first rotating member is fixedly fitted, said facing member has an upper end face which is an upper end face of said second shaft, and a space between said facing surface and said upper end face of said facing member is set to a.

* * * * *